(12) United States Patent
Leach

(10) Patent No.: US 7,112,364 B1
(45) Date of Patent: Sep. 26, 2006

(54) FOAM LAMINATES

(75) Inventor: Roger John Leach, Kingston-by-Lewés (GB)

(73) Assignee: Thorstone Business Management Limited, Colby (GB)

( * ) Notice: Subject to any disclaimer, the term of this patent is extended or adjusted under 35 U.S.C. 154(b) by 0 days.

(21) Appl. No.: 10/110,150

(22) PCT Filed: Oct. 9, 2000

(86) PCT No.: PCT/GB00/03882

§ 371 (c)(1),
(2), (4) Date: Apr. 5, 2002

(87) PCT Pub. No.: WO01/26890

PCT Pub. Date: Apr. 19, 2001

(30) Foreign Application Priority Data

Oct. 8, 1999 (GB) .................................. 9923908.9

(51) Int. Cl.
*B32B 5/14* (2006.01)
*G02B 5/08* (2006.01)

(52) U.S. Cl. ................ 428/310.5; 359/883; 428/306.6; 442/22; 442/30; 442/55; 442/56; 442/221; 442/223; 442/315; 442/370; 442/372

(58) Field of Classification Search ................ 428/613, 428/71, 158, 170, 212, 218, 304.4, 310.5, 428/306.6; 359/838–884; 220/902; 264/413, 264/415; 442/22, 30, 55–56, 221, 224, 225, 442/226, 227, 315, 370, 223; 427/372.2, 427/373; 52/309.4, 309.8, 309.9, 309.11
See application file for complete search history.

(56) References Cited

U.S. PATENT DOCUMENTS 3,099,516 A 7/1963 Henrickson .................... 18/48
3,619,436 A 11/1971 Gruss et al.
3,985,429 A * 10/1976 Fleischer .................... 359/848
4,211,407 A 7/1980 Tomar
4,550,986 A 11/1985 Leach
4,863,791 A * 9/1989 Steward et al. .......... 428/310.5
4,971,322 A 11/1990 Jaeger
5,300,174 A * 4/1994 Leach et al. ................ 156/283

FOREIGN PATENT DOCUMENTS

| CA | 904518 | 7/1972 |
|---|---|---|
| DE | 1 262 571 | 3/1968 |
| EP | 0298659 | 1/1989 |
| EP | 0609721 | 8/1994 |
| FR | 1342865 | 2/1964 |

(Continued)

*Primary Examiner*—Terrel Morris
*Assistant Examiner*—Jennifer Boyd
(74) *Attorney, Agent, or Firm*—Davis & Bujold, P.L.L.C.

(57) ABSTRACT

Foaming of a resinous backing (2) to a glass sheet (1) is frustrated at the interface (3) with the glass by maintaining the glass sheet (1) cool during formation of the foam. The degree of foaming is nil at the interface (3) to effect a strong bond there, and increases progressively through the thickness of the foam body (2) away from the interface (3). The foam body (2) is backed by glass-fibre cloth (4) that is impregnated with the resin from which the foaming gas has been vented so as to bond the cloth (4) to the body (2) and to an outer aluminium foil (5). The glass sheet (3) may be a mirror, and may be replaced by a glass laminate (20;23) that includes a fused-powder coating (22;25) with or without an aluminium foil backing.

16 Claims, 2 Drawing Sheets

FOREIGN PATENT DOCUMENTS

| | | |
|---|---|---|
| FR | 2 288 610 | 2/1974 |
| GB | 1 322 027 | 11/1970 |
| GB | 1 358 932 | 8/1971 |
| GB | 2 104 444 | 3/1983 |
| GB | 2 179 594 | 8/1986 |
| JP | 3-159733 | 7/1991 |

* cited by examiner

FOAM LAMINATES

FIELD OF THE INVENTION

This invention relates to foam laminates.

BACKGROUND OF THE INVENTION

Foam laminates are known for use in the support of glass or plastics sheets for architectural and other purposes, and it is one object of the present invention to provide an improved form of foam laminate for use in such support.

SUMMARY OF THE INVENTION

According to one aspect of the present invention there is provided a foam laminate in which a facing or other element of the laminate is backed by a body of plastics foam, wherein the degree of foaming within said body increases away from the interface with said element.

According to another aspect of the invention a method of forming a foam laminate in which a facing or other element of the laminate is backed by a body of plastics foam, wherein the formation of foam within said body is frustrated at its interface with said element.

Said element may be a sheet of glass (for example in the form of a mirror) a sheet of plastics or a laminate including such a sheet.

The foam material may be a resin that contains gassing agents to give rise to exothermic foaming in heated conditions. Alternatively a similar resin mix without gassing agents may be used, foaming being induced by the injection of suitable agents during gelling of the material. In the first case, foaming may be frustrated at the interface with said element by maintaining the interface cool, whereas (or in addition) in the second case, injection of the foaming agents may be delayed until after the formation of a resinous bond with said element has begun to be established.

BRIEF DESCRIPTION OF THE DRAWINGS

A foam laminate and a method of manufacture thereof all according to the present invention, will now be described, by way of example, with reference to the accompanying drawing in which.

DETAILED DESCRIPTION OF THE INVENTION

Figure 1:
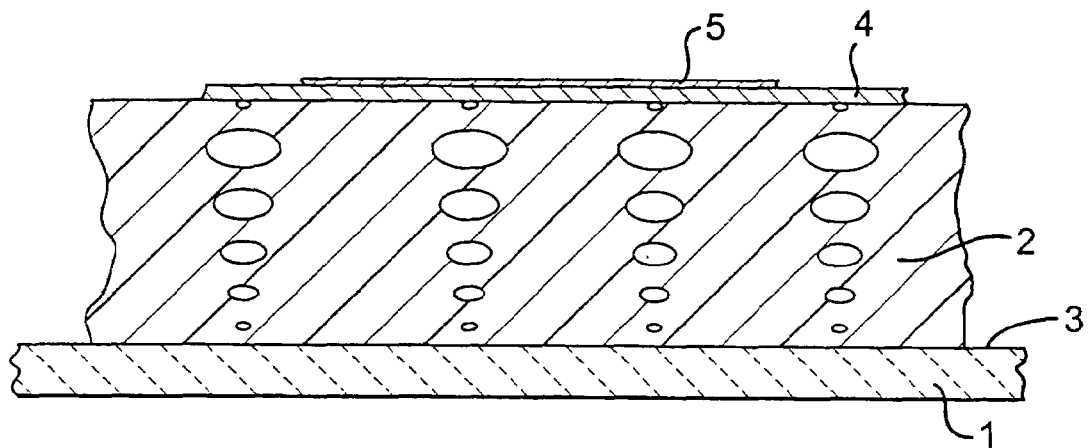
FIG. 1 is a sectional side-elevation of the foam laminate according to the invention.

Referring to FIG. 1, the laminate involves a sheet 1 of glass that is supported by a layer 2 of resinous plastics foam bonded to the back surface 3 of the sheet 1; where a mirror is involved the surface 3 is a silvered surface. The foam layer 2 is backed by a continuous glass-fibre cloth 4 that is bonded into the layer 2 by impregnation with the foam material. An aluminium foil 5 is bonded to the roving or cloth 4; the foil 5 and cloth 4 act together to balance against warping of the laminate.

To the extent the laminate has so far been described it is generally of a conventional form used for supporting clear glass and mirrors, in particular in architectural applications. The conventional laminates have been found to be somewhat deficient in their resistance to impact applied to the facing glass, but the laminate according to the invention provides improved impact-resistance in this regard. To this end, the foam layer 2 of the present laminate is not uniformly foamed throughout its thickness as with the foam layers of conventional laminates. More particularly, the region of the foam layer 2 interfacing the surface 3 is not foamed at all, but exists as a continuous resinous body enhancing adhesion and impact resistance in the finished product. The degree of foaming, moreover, increases progressively throughout the layer 2 from the surface 3 to the cloth 4, so that there is a gradual transition in foaming to ensure enhanced strength.

Where the glass sheet 1 is transparent or translucent without a silver backing, the layer 2 may include pigmentation to give a colour effect in the glass.

Figure 2:
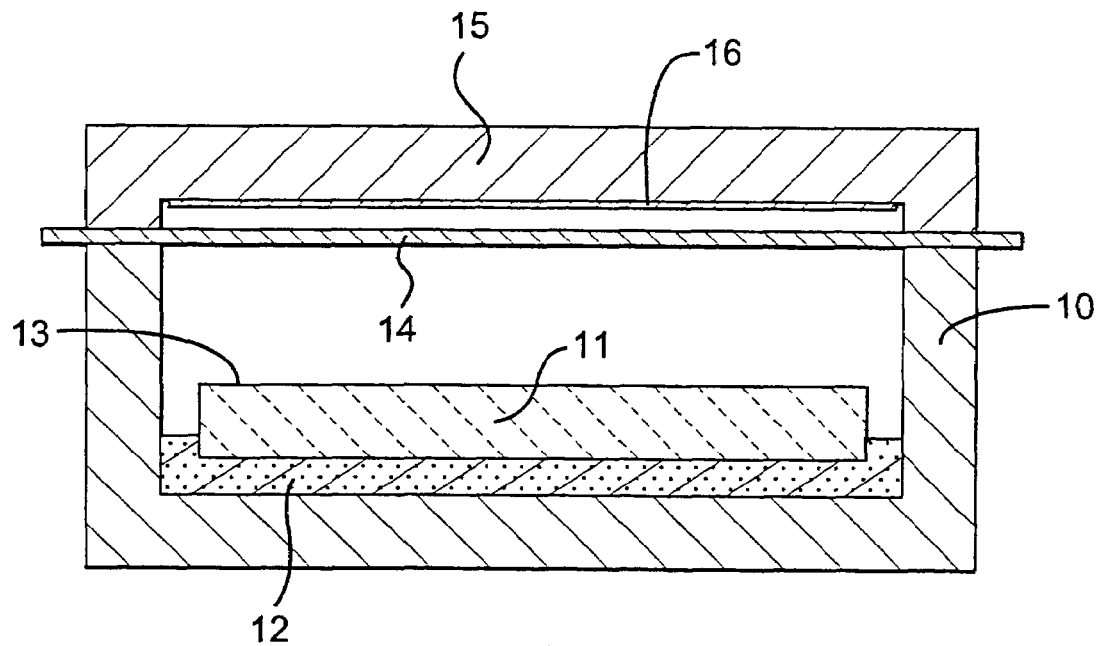
FIG. 2 is illustrative of the method of manufacture of the foam laminate of FIG. 1, according to the invention.

Manufacture of the laminate may be carried out as illustrated in FIG. 2, using a pressure-resistant cassette 10. The glass sheet 11 is placed face down in the cassette 10 on a resiliently-compressible bed 12 of scrim. In conventional manufacture, the foam-producing resinous material would be poured onto the back surface 13 of the glass 11 while the surface 13 is warmed within the cassette 10 to encourage foaming, however, in this case the surface is kept cool (for example at 15 degrees Celsius) to frustrate the foaming action. Accordingly, as the material is poured in there is established a region in contact with the cool surface 13 where no foaming takes place and the material sets as a continuous resinous body bonding hard to the surface 13 (the surface 13 is to be clean and dry to ensure the hard bond). As the material begins to rise within the cassette 10 it is progressively insulated more and more from the cool surface 13 so that it foams to an increasing extent with the exothermic generation of heat from the foaming process. Foam-cells of progressively increasing size are therefore formed as the layer 12 builds up.

Glass-fibre cloth 14 is draped across the open top of the cassette 10 and held firmly in place under the cassette-lid 15. The lid 15 is heated (for example to 40 degrees Celsius) and this warms aluminium foil 16 inserted above the cloth 14. The warmed foil 16 accelerates foaming when the still-resinous foam has risen within the cassette 10 to reach the cloth 14. The foam pushes the cloth 14 upwards and rises through it, displacing any air and other gas remaining within the cassette 10 out through the cloth 14 where it extends under the lid 15. The rise through the cloth 14 is faster at the centre of the cassette 10 where it is warmer, and this ensures that the air and other gas is pushed outwards from the centre as the cassette 10 becomes filled with the foam. Cure of the foam then progresses to completion, for example under a pressure within the cassette 10 of about 50 psi (pounds per square inch) for some twenty minutes. The board when released from the cassette 10 may typically have a density in excess of 50 kilograms per cubic meter.

The resin forms a good bond with the impregnated cloth 14 and the foil 16. Because of the venting of gas through the cloth 14, there is much-reduced or no foaming in the region of this bond.

The glass sheet 11 when placed in the cassette 10 is laid face down upon the resiliently-compressible bed 12 of scrim. As the sheet 11 is pressed down harder by the effect of the swelling foam, the bed 12 effects a seal that inhibits flow of the resin round the edge of the sheet 11 onto the front face of the glass. The foam impregnates the scrim bed 12 where this is exposed to the resin material and so forms a natural packing for the laminate when it is released from the cassette 10; the scrim bed 12 is accordingly left in place when the laminate is removed from the cassette 10 after manufacture, to provide protection during transit to a building site or other destination and until the laminate is finally installed.

It has been found that when a laminate manufactured as described is subjected to fire tests with temperatures in excess of 700 degrees Celsius at the front surface of the glass, the glass surface resists the flame and although the foam eventually burns it becomes a char that resists further burning. The glass remains supported but the flame at first de-laminates the aluminium and then chars the foam held in position by the continuous glass roving or cloth (4,14); this is a significant advantage resulting from the use of the continuous roving. The char supported by the glass protects the foam from the flame and the entire composite remains integral.

Figure 3:
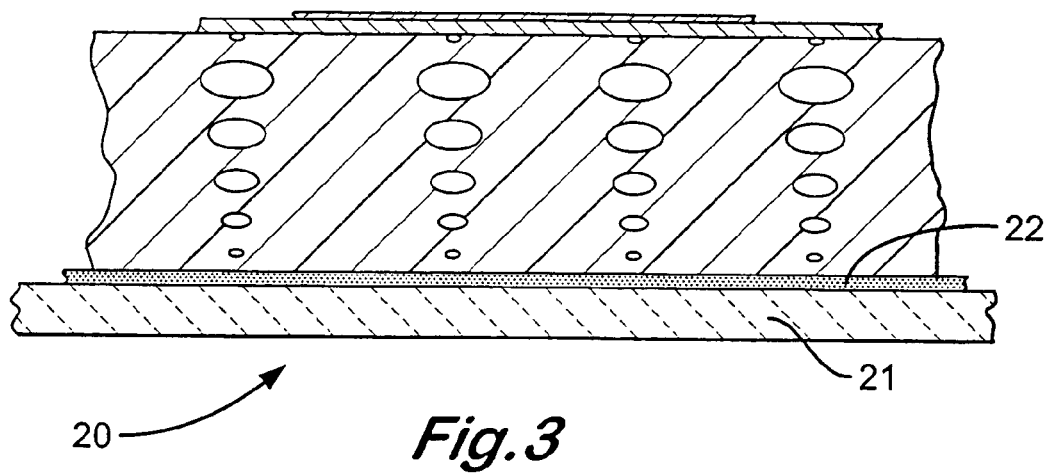
FIGS. 3 and 4 are sectional side-elevations showing modifications of the foam laminate of FIG. 1.
Figure 4:
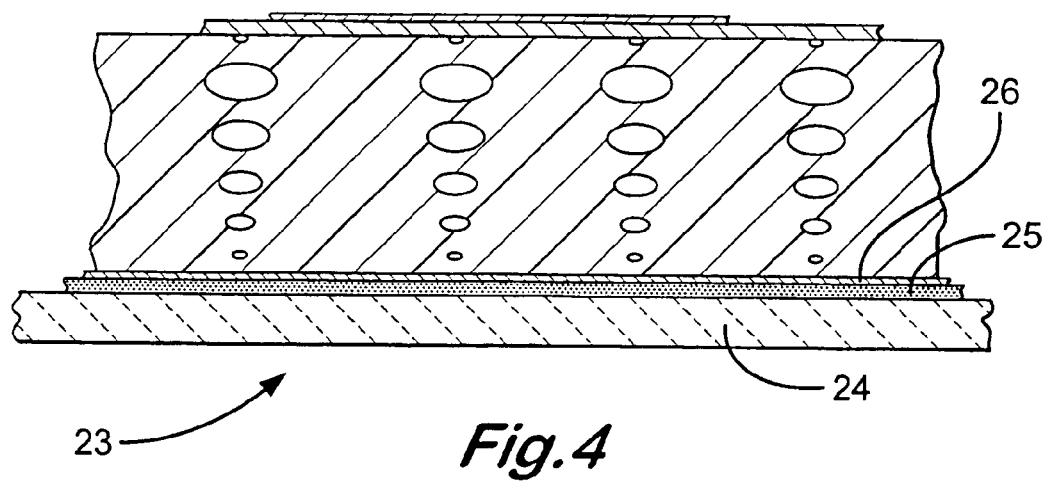

FIGS. 3 and 4 illustrate modifications of the laminate of FIG. 1 and will now be described.

Referring to FIG. 3, the glass sheet 1 of the laminate of FIG. 1 is in this case replaced by a glass laminate 20 formed by a transparent or translucent glass sheet 21 having a back-coating 22 of polyester. The coating 22, which may be formed of fused powder-coating material, includes pigmentation to give a colour effect (with graphics or otherwise) in the glass sheet 21. It has been found that the presence of the coating 22 adds significantly to the ability of the glass sheet 21 to remain as a coherent body under the effects of fire.

Fire resistance is further enhanced in the circumstances illustrated in FIG. 4 where the glass sheet 1 of the laminate of FIG. 1 is replaced by a glass laminate 23. The laminate 23, like the laminate 20 of FIG. 3, involves a glass sheet 24 having a fused-powder back-coating 25, but in this case the coating 25 is backed by aluminum foil 26. The foil 26, which acts as a flame barrier, greatly improves the fire-resistance rating of the foam laminate as a whole.

The invention claimed is:

1. A glass-faced architectural panel comprising:
   a first element including a glass sheet for facing the panel, and the first element having a rear surface;
   a foam body formed from a foam-producing resinous material, the foam body having a front surface and a rear surface, the front surface of the foam body being bonded to the rear surface of the first element such that the foam body provides support for the first element; and
   a further element directly bonded to the rear surface of the foam body to form a backing to the glass-faced architectural panel;
      wherein the foam body has a varying degree of foaming between the front and rear surfaces whereby substantially zero percent foaming occurs within the foam body at the front surface and a progressively increasing degree of foaming occurs between the front surface of the foam body and the rear surface of the foam body, and the further element comprises a cloth impregnated by the foam-producing resinous material of the foam body, at the rear surface of the foam body, which bonds a front surface of the cloth directly to the rear surface of the foam body.

2. The panel according to claim 1, wherein the cloth is glass-fiber cloth.

3. The panel according to claim 1, wherein a metal foil is bonded to the cloth.

4. The panel according to claim 1, wherein the first element is a mirror.

5. The panel according to claim 1, wherein the first element includes a fused-powder coating bonded to a back face of the glass sheet.

6. The panel according to claim 5, wherein the first element includes a metal-foil backing to the coating.

7. A method of forming a glass-faced architectural panel comprising the steps of:
   providing a first element including a glass sheet for facing the panel, and the first element having a rear surface;
   forming a foam body from a foam-producing resinous material, the foam body having a front surface and a rear surface, the front surface of the foam body being bonded to the rear surface of the first element such that the foam body provides support for the first element; and
   bonding a further element directly to the rear surface of the foam body to form a backing to the glass-faced architectural panel;
      wherein the foam body is formed with a varying degree of foaming between the front and rear surfaces whereby substantially zero percent foaming occurs within the foam body at the front surface and a progressively increasing degree of foaming occurs between the front surface of the foam body and the rear surface of the foam body, and the further element comprises a cloth impregnated by the foam-producing resinous material of the foam body, at the rear surface of the foam body, which facilitates bonding of a front surface of the cloth directly to the rear surface of the foam body, and a foil backing is bonded to a rear surface of the cloth such that the foil backing forms the backing of the glass-faced architectural panel.

8. The method according to claim 7, further comprising the step of using a glass-fiber cloth as the cloth.

9. The method according to claim 7, further comprising the step of using a mirror as the first element.

10. The method according to claim 7, further comprising the step of providing a fused-powder coating on a back face of the glass sheet.

11. The method according to claim 10, further comprising the step of applying a metal-foil backing to the coating.

12. A method of forming a glass-faced architectural panel consisting of the steps of:
   providing a first element including a glass sheet for facing the panel, and the first element having a rear surface;
   forming a foam body from a foam-producing resinous material, the foam body having a front surface and a rear surface, the front surface of the foam body being bonded to the rear surface of the first element such that the foam body provides direct support for the first element;
   bonding a cloth directly to the rear surface of the foam body to form a backing of the glass-faced architectural panel by impregnating the cloth with the foam-producing resinous material; and
   maintaining the rear surface of the first element at a cool temperature to inhibit foam production of the foam-producing resinous material at the rear surface of the first element during formation of the foam body such that the foam body has a varying degree of foaming between the front and rear surfaces whereby substantially zero percent foaming occurs within the foam body at the front surface and a progressively increasing degree of foaming occurs between the front surface of the foam body and the rear surface of the foam body, and the further element comprises a cloth impregnated by the foam-producing resinous material of the foam body, at the rear surface of the foam body, which bonds directly to the rear surface of the foam body, and a foil backing is bonded to a rear surface of the cloth such that the foil backing forms the backing of the glass-faced architectural panel.

13. The method according to claim 12, further comprising the step of using a glass-fiber cloth as the cloth.

14. The method according to claim 12, further comprising the step of providing a fused-powder coating on a back face of the glass sheet.

15. The method according to claim 14, further comprising the step of applying a metal-foil backing to the coating.

16. The method according to claim 12, further comprising the steps of using a glass-fiber cloth as the cloth;

providing a fused-powder coating on a rear surface of the glass sheet;

applying a metal-foil backing to the fused-powder coating.

* * * * *